United States Patent
Shi et al.

(10) Patent No.: US 12,203,818 B2
(45) Date of Patent: Jan. 21, 2025

(54) METHOD, SYSTEM, DEVICE AND MEDIUM FOR ONLINE MONITORING OF PLANE STRESS FIELD WITHOUT BASELINE DATA BASED ON PIEZOELECTRIC TRANSDUCER ARRAY

(71) Applicant: Harbin Institute of Technology, Harbin (CN)

(72) Inventors: Weijia Shi, Harbin (CN); Bo Zhao, Harbin (CN); Jiubin Tan, Harbin (CN)

(73) Assignee: Harbin Institute of Technology, Harbin (CN)

( * ) Notice: Subject to any disclaimer, the term of this patent is extended or adjusted under 35 U.S.C. 154(b) by 424 days.

(21) Appl. No.: 17/704,090

(22) Filed: Mar. 25, 2022

(65) Prior Publication Data

US 2023/0228632 A1  Jul. 20, 2023

(30) Foreign Application Priority Data

Jan. 19, 2022  (CN) ........................ 202210062753.X (51) Int. Cl.
*G01L 5/173* (2020.01)
*G01L 1/16* (2006.01)
(Continued)

(52) U.S. Cl.
CPC .............. *G01L 1/162* (2013.01); *G01L 5/167* (2013.01); *G01L 5/173* (2020.01); *G01L 1/255* (2013.01);
(Continued)

(58) Field of Classification Search
CPC ......... G01L 1/162; G01L 5/167; G01L 5/173; G01L 1/255; G01M 5/0066;
(Continued)

(56) References Cited

FOREIGN PATENT DOCUMENTS

CN  110632177 A  * 12/2019  ............. G01N 29/04
CN  110687208 A  1/2020
(Continued)

OTHER PUBLICATIONS

Mei et al. (Pure S0 and SH0 detections of various damage types in aerospace composites, Composites Part B: Engineering, vol. 189, 2020, 107906, ISSN 1359-8368, https://doi.org/10.1016/j.compositesb.2020.107906.) (Year: 2020).*
(Continued)

*Primary Examiner* — Lisa M Caputo
*Assistant Examiner* — Christian T Bryant
(74) *Attorney, Agent, or Firm* — IPRO, PLLC (57) ABSTRACT

The disclosure provides a method, system, device and medium for online monitoring of a plane stress field without baseline data based on a piezoelectric transducer array. Since Lamb waves have complex multi-mode characteristics, a suitable excitation frequency needs to be selected according to geometric dimensions of the structure to be measured, and then, only low-order mode Lamb waves are excited inside the measured structure to avoid serious waveform aliasing. For isotropic measured objects, anisotropic characteristics will be generated under the action of pre-stresses, that is, the propagation velocities of ultrasonic waves in all directions are different, but there is a linear relationship between velocity changes in different propagation directions and stresses. Therefore, there is still a linear relationship between the difference of velocity changes in different propagation directions and the stress. According to this characteristic, a characterization method of an absolute stress field without baseline data can be implemented. The method of the disclosure can make full use of the low attenuation characteristics of the Lamb waves to realize online monitoring of the plane stress field with a large coverage area.

10 Claims, 4 Drawing Sheets

(51) Int. Cl.
  *G01L 5/167*   (2020.01)
  *G01N 3/06*    (2006.01)
  *G01N 3/08*    (2006.01)
  *G01N 29/07*   (2006.01)
  *G01N 29/44*   (2006.01)
  G01L 1/25      (2006.01)
  G01M 5/00      (2006.01)
  G01N 29/04     (2006.01)
  G01N 29/24     (2006.01)

(52) U.S. Cl.
  CPC ........ *G01M 5/0041* (2013.01); *G01M 5/0066* (2013.01); *G01N 3/06* (2013.01); *G01N 3/08* (2013.01); *G01N 29/041* (2013.01); *G01N 29/07* (2013.01); *G01N 29/2437* (2013.01); *G01N 29/44* (2013.01); *G01N 2203/0003* (2013.01); *G01N 2203/0017* (2013.01); *G01N 2203/006* (2013.01); *G01N 2203/0075* (2013.01); *G01N 2203/0658* (2013.01); *G01N 2203/0676* (2013.01)

(58) Field of Classification Search
  CPC ......... G01M 5/0041; G01N 3/06; G01N 3/08; G01N 29/041; G01N 29/07; G01N 29/2437; G01N 29/44; G01N 2203/0003; G01N 2203/0017; G01N 2203/006; G01N 2203/0075; G01N 2203/0658; G01N 2203/0676
  See application file for complete search history.

(56) References Cited

FOREIGN PATENT DOCUMENTS

| | | | | |
|---|---|---|---|---|
| CN | 111751032 A | * | 10/2020 | ............ G01L 1/255 |
| CN | 112326786 A | | 2/2021 | |
| CN | 113218875 A | * | 8/2021 | ........... G01L 5/0047 |

OTHER PUBLICATIONS

Zhu et al. (Fatigue Damage Evaluation Using Nonlinear Lamb Waves with Quasi Phase-Velocity Matching at Low Frequency. Materials (Basel). Oct. 9, 2018;11(10):1920. doi: 10.3390/ma11101920. PMID: 30304854; PMCID: PMC6213901.) (Year: 2018).*

* cited by examiner

FIG. 7 ns, calculating influence of stress changes on Lamb wave velocities in different directions;

METHOD, SYSTEM, DEVICE AND MEDIUM FOR ONLINE MONITORING OF PLANE STRESS FIELD WITHOUT BASELINE DATA BASED ON PIEZOELECTRIC TRANSDUCER ARRAY

TECHNICAL FIELD

The disclosure belongs to the technical field of structural health monitoring, can be applied to the field of online monitoring of plane stress fields of metal materials, and particularly relates to a method, system, device and medium for online monitoring of a plane stress field without baseline data based on a piezoelectric transducer array.

BACKGROUND

With the vigorous development of the aerospace industry, in order to ensure the safe and reliable operation of devices and avoid the occurrence of major safety accidents, the service requirements for key components of mechanical structures are getting higher and higher. Especially in terms of strength, fatigue life and dimensional stability, the state of the internal stress field of the material is an important index for measuring these characteristics. However, mechanical structural components always work in a complex cyclic stress state. The cyclic stress is generally less than the allowable stress of the mechanical structure, so it will not cause damage to the structure immediately. However, with the cyclic loading of the stress, fatigue damage will be caused, and finally, defects such as deformations and cracks will be formed. Therefore, it is crucial to develop an efficient and non-destructive internal stress field measurement method which can monitor the stress state in real time and record the stress loading history. According to the monitored stress state, stress relief and danger warning can be performed in time, thereby improving the safety performance of the devices and ensuring the safety of life and property.

At present, non-destructive detection methods of stress fields mainly include: an X-ray diffraction method, a neutron diffraction method, a magnetic measurement method, an ultrasonic measurement method, etc., where the ultrasonic measurement method has been widely used due to the advantages of simple device, easy operation, wide measurement range and low requirements for measured surfaces.

In 2020, in the disclosure patent CN111751032A, Luo Jinheng et al. disclosed "an ultrasonic stress measurement method based on array probes". In this method, ultrasonic probes are arranged in a one-transmitting and multi-receiving manner, the mean stress in interval regions of receiving probes is calculated by measuring the change rate of the propagation times between ultrasonic probe arrays to serve as a discrete function, and then, the function is interpolated to obtain the mean stress in a distribution direction of the arrays. Compared with a traditional one-transmitting and one-receiving method, this method using array probes can effectively improve the spatial resolution of measurement, and can avoid rapid characterization under complex stress conditions on the basis of rotating the probes in different directions. However, this method must pre-calibrate and store the baseline data when there is no stress. In actual use, the baseline data changes greatly, and thus, this method is not suitable for online monitoring of stresses.

In 2021, in the disclosure patent CN113218875A, Ding Hui et al. disclosed "a laser ultrasonic measurement method for residual stresses of metal additive manufacturing parts". In this method, by means of the advantages of laser ultrasound, such as long-distance monitoring, wide frequency band, multi-mode waveform and multiple excitation source shapes, ultrasonic surface waves are excited inside metal additives, then acoustoelastic coefficients of the metal additives in different directions are calibrated through tensile tests, and a residual stress gradient model is used to calculate the graded distribution of residual stresses inside the additives, thereby effectively solving the problems of complex residual stress distribution inside metal additive manufacturing parts and difficult detection. Although this method can realize rapid and complete non-contact non-destructive detection of residual stresses of the measured parts, the ultrasonic waves excited by laser mainly depend on a thermoelastic effect or an ablation effect, which may cause certain damage to the surface of the measured object. Furthermore, due to complex measurement devices and higher measurement conditions, the laser ultrasonic method is not suitable for real-time monitoring of stress states.

In 2019, in the disclosure patent CN110632177A, Wang Yongqing et al. disclosed "an electromagnetic ultrasonic detection method for plane residual stresses". This method designs an electromagnetic ultrasonic detection system which uses ultrasonic coils in electromagnetic ultrasonic surface wave probes to detect ultrasonic signals in three different directions, and then calculates the magnitude and direction of the plane stress according to the acoustoelastic effect of surface waves. Although this method can measure the plane stress field, the measurement process is complex. For detection objects of different materials, a radio frequency connector circuit board and an impedance matching network need to be redesigned, which seriously reduces the use efficiency. Moreover, when this method is used for measurement, each time of measurement needs to obtain the data of zero-stress standard samples as reference data to calculate the absolute stress of the object to be measured. Therefore, when the environmental conditions and the reference data measurement environment change greatly, the error of the measurement result is larger, and thus, this method is not suitable for online monitoring of the plane stress field.

SUMMARY

In order to solve the problems in the prior art, the disclosure provides a method, system, device and medium for online monitoring of a plane stress field without baseline data based on a piezoelectric transducer array.

The disclosure is implemented through the following technical solutions. The disclosure provides a method for online monitoring of a plane stress field without baseline data based on a piezoelectric transducer array, including:

according to geometric dimensions and material parameters of a measured object, establishing a dispersion curve of Lamb waves, determining a cut-off frequency of a first-order Lamb wave mode, then selecting a suitable frequency within the cut-off frequency to excite piezoelectric wafers, and generating pure S0-mode Lamb waves by means of symmetrical excitation;

according to the invariant property of acoustoelastic coefficients of isotropic materials in different coordinate systems, obtaining acoustoelastic equations in different propagation directions, then calculating a difference to obtain a linear relationship between the difference of velocity changes in different directions and the stress, and at the same time, according to a linear superposition relationship between stresses in different directions, calculating the magnitude of a plane stress field of the measured object through the difference of three groups of velocity changes in different directions, thereby finally realizing the accurate characterization of the plane stress field by means of measurement results of the piezoelectric transducer array in different directions; and exciting and receiving Lamb wave signals inside the measured object, performing Hilbert transform on the received signals, extracting signal envelopes, then calculating acoustic time differences in different propagation directions through a cross-correlation algorithm, according to a linear relationship between acoustic time differences and velocity differences, determining that there is still a linear relationship between stresses and acoustic time differences in different propagation directions, and then, substituting three groups of acoustic time differences in different directions into the pre-calibrated acoustoelastic equations to solve the plane stress field of the measured object.

Further, according to the geometric dimensions and the material parameters of the measured object, the dispersion curve of Lamb waves is established, and a Lamb wave dispersion equation of a free plate is a Rayleigh-Lamb wave dispersion equation, which meets:

$$\frac{\tan(qh)}{\tan(ph)} = -\frac{4k^2pq}{(q^2-k^2)^2}, \tag{1}$$

$$\frac{\tan(qh)}{\tan(ph)} = -\frac{(q^2-k^2)^2}{4k^2pq}, \tag{2}$$

where p and q are respectively expressed as:

$$p = \sqrt{\frac{\omega^2}{c_L^2} - k^2}, \tag{3}$$

$$q = \sqrt{\frac{\omega^2}{c_T^2} - k^2}, \tag{4}$$

in the equation, $c_L$ and $c_T$ respectively represent velocities of longitudinal waves and transverse waves, h represents a half of a thickness of the plate, ω represents an angular frequency of ultrasonic waves, and k represents a wave number.

Further, modulation signals with a frequency of 500 kHz are selected to excite the Lamb waves.

Further, assuming that the measured object is subjected to plane stresses, in a coordinate system x-o-y, normal stresses are $\sigma_{11}$ and $\sigma_{22}$, and shear stresses are $\sigma_{12}$ and $\sigma_{21}$; according to the symmetry of the stresses, the values of $\sigma_{12}$ and $\sigma_{21}$ are equal, therefore, for Lamb waves propagating in an x direction, the acoustoelastic effect of the plane stress field can be expressed as:

$$\Delta v = K_{11}\sigma_{11} + K_{12}\sigma_{12} + K_{22}\sigma_{22} \tag{5},$$

in the equation, $K_{11}$, $K_{12}$ and $K_{22}$ respectively represent acoustoelastic coefficients of the Lamb waves in different propagation directions;

when the measured object belongs to an isotropic material, the acoustoelastic coefficients in different coordinate systems are exactly the same, therefore, the acoustoelastic effect of the Lamb waves propagating in an x' direction can be expressed as:

$$\Delta v = K_{11}\sigma_{11}' + K_{12}\sigma_{12}' + K_{22}\sigma_{22}' \tag{6},$$

in the equation, $\sigma_{11}'$, $\sigma_{12}'$ and $\sigma_{22}'$ represent normal stresses and shear stresses in a new coordinate system x'-o-y';

according to a coordinate transformation relationship between stresses, the following can be obtained:

$$\sigma_{11}' = \frac{\sigma_{11}+\sigma_{22}}{2} + \frac{\sigma_{11}-\sigma_{22}}{2}\cos(2\theta) + \sigma_{12}\sin(2\theta), \tag{7}$$

$$\sigma_{22}' = \frac{\sigma_{11}+\sigma_{22}}{2} - \frac{\sigma_{11}-\sigma_{22}}{2}\cos(2\theta) - \sigma_{12}\sin(2\theta), \tag{8}$$

$$\sigma_{12}' = -\frac{\sigma_{11}-\sigma_{22}}{2}\sin(2\theta) + \sigma_{12}\cos(2\theta), \tag{9}$$

where θ represents an angle;
a difference between propagation velocities along angles $\theta_1$ and $\theta_2$ is:

$$\begin{aligned}dv &= \Delta v(\theta_1) - \Delta v(\theta_2) \\ &= K_{11}\left[\frac{\sigma_{11}-\sigma_{22}}{2}(\cos(2\theta_1)-\cos(2\theta_2))\right.\\ &\quad +\sigma_{12}(\sin(2\theta_1)-\sin(2\theta_2))] \\ &\quad +K_{22}\left[\frac{\sigma_{11}-\sigma_{22}}{2}(-\cos(2\theta_1)+\cos(2\theta_2))\right.\\ &\quad +\sigma_{12}(-\sin(2\theta_1)+\sin(2\theta_2))] \\ &\quad +K_{12}\left[\frac{\sigma_{11}-\sigma_{22}}{2}(-\sin(2\theta_1)+\sin(2\theta_2))\right.\\ &\quad +\sigma_{12}(\cos(2\theta_1)-\cos(2\theta_2))]\end{aligned} \tag{10}$$

it can be seen from Equation (10) that the influence of each component of the plane stress field on dv has a linear superposition relationship, and when the plane stress field has only one component, dv can be respectively simplified as:

$$\begin{aligned}dv &= \Delta v(\theta_1) - \Delta v(\theta_2) \\ &= (K_{11}-K_{22})\left[\frac{\sigma_{11}}{2}(\cos(2\theta_1)-\cos(2\theta_2))\right], \\ &\quad -K_{12}\left[\frac{\sigma_{11}}{2}(\sin(2\theta_1)-\sin(2\theta_2))\right]\end{aligned} \tag{11}$$

$$\begin{aligned}dv &= \Delta v(\theta_1) - \Delta v(\theta_2) \\ &= (K_{11}-K_{22})\left[\frac{\sigma_{22}}{2}(-\cos(2\theta_1)+\cos(2\theta_2))\right], \\ &\quad -K_{12}\left[\frac{\sigma_{22}}{2}(-\sin(2\theta_1)+\sin(2\theta_2))\right]\end{aligned} \tag{12}$$

$$\begin{aligned}dv &= \Delta v(\theta_1) - \Delta v(\theta_2) \\ &= (K_{11}-K_{22})[\sigma_{12}(\sin(2\theta_1)-\sin(2\theta_2))]; \\ &\quad +K_{12}[\sigma_{12}(\cos(2\theta_1)-\cos(2\theta_2))]\end{aligned} \tag{13}$$

it can be found that to complete the measurement of the plane stress field, it is only necessary to determine the values of $K_{11}$-$K_{22}$ and $K_{12}$ through calibration tests;

assuming that there is only $\sigma_{11}$, $\theta_1$ is 0° and $\theta_2$ is 90°, the following can be obtained:

$$dv = \Delta v(\theta_1) - \Delta v(\theta_2) = (K_{11} - K_{22})\sigma_{11} \tag{14};$$

assuming that $\theta_1$ is 0° and $\theta_2$ is 45°, when there is $\sigma_{11}$, dv is expressed as:

$$dv = \Delta v(\theta_1) - \Delta v(\theta_2) = (K_{11} - K_{22})\frac{\sigma_{11}}{2} + K_{12}\frac{\sigma_{11}}{2}; \tag{15}$$

two acoustoelastic values of $K_{11}$-$K_{22}$ and $K_{12}$ are determined through Equations (14) and (15); a whole calibration process does not require zero-stress samples, and in a tensile test, it is necessary to measure a Lamb wave group velocity difference between two groups of different propagation directions;

the value of $K_{11}-K_{22}$ is set as K, and then, Equation (10) can be transformed into:

$$dv = \Delta v(\theta_1) - \Delta v(\theta_2) \quad (16)$$
$$= K\left[\frac{\sigma_{11}}{2}(\cos(2\theta_1) - \cos(2\theta_2))\right]$$
$$-K_{12}\left[\frac{\sigma_{11}}{2}(\sin(2\theta_1) - \sin(2\theta_2))\right]$$
$$+K\left[\frac{\sigma_{22}}{2}(-\cos(2\theta_1) + \cos(2\theta_2))\right] ;$$
$$-K_{12}\left[\frac{\sigma_{22}}{2}(-\sin(2\theta_1) + \sin(2\theta_2))\right]$$
$$+K[\sigma_{22}(\sin(2\theta_1) - \sin(2\theta_2))]$$
$$+K_{12}[\sigma_{12}(\cos(2\theta_1) - \cos(2\theta_2))]$$

in Equation (16), dv is a measured value, K and $K_{12}$ are known quantities, and three components of the plane stress field are unknown quantities, therefore, by solving the equations established by three groups of dv, two normal stresses and one shear stress can be obtained; and in three times of dv measurement, it is not necessary to use the data in a zero-stress state as reference data, therefore, the measurement of the plane stress field without baseline data can be realized finally through multi-angle acquisition of piezoelectric transducer array sensors.

Further, pre-stresses are applied to the measured object in different directions, and then, the influence of the stresses on the S0-mode group velocity is analyzed; a stress of $T_{33}=100$ MPa is applied to the measured object to obtain a velocity change in each propagation direction relative to a zero-stress state within a range of 0-360° in a plane perpendicular to a z axis; and 20 MPa is taken as a step value, $T_{33}$ is changed from 0 MPa to 100 MPa to obtain velocity difference changes of 0° and 90° as well as 0° and 45°, and acoustoelastic coefficients K and $K_{12}$ of the measured object are calculated according to Equations (14) and (15).

Further, after the calibration of the acoustoelastic coefficients is completed, actual measurement of the stress state of the measured structure can be performed, an arbitrary waveform generator is used to generate low-voltage modulation signals which are then amplified by a power amplifier to excite piezoelectric wafers to generate Lamb waves, S0-mode Lamb waves propagate inside the measured object and are received by three piezoelectric wafer sensors, received signals are mV-order weak signals, the weak signals are amplified and filtered, a lower cut-off frequency and an upper cut-off frequency of a filter are set according to bandwidths of excitation signals, the amplified and filtered signals are input into a high-speed data acquisition system, the signals are encoded by a field programmable gate array (FPGA) chip, and sampled signals are transmitted into a host computer by a PXIE bus and are stored for subsequent data processing.

Further, Hilbert transform is performed on the signals received by the piezoelectric wafer sensors; after the Hilbert transform, the amplitude envelopes of the received signals can be extracted, and then, a propagation acoustic time difference between S0-mode Lamb waves in different propagation directions can be calculated by a cross-correlation algorithm; since the propagation distances between transmitting transducers and receiving transducers are the same, for isotropic materials, the relationship between a propagation time difference and a velocity difference meets:

$$\Delta t = t_1 - t_2 = \frac{L}{c_1} - \frac{L}{c_2} = \frac{L(c_2-c_1)}{c_1 c_2} \approx -\frac{L\Delta c}{c^2}, \quad (17)$$

in the equation, L represents a distance between receiving and transmitting transducers, and c represents a propagation velocity when there is no stress; and it can be seen from Equation (17) that there is an approximate linear relationship between acoustic time differences in different propagation directions and stresses, therefore, the acoustic time differences obtained by the cross-correlation algorithm are substituted into the calibrated acoustoelastic equations to determine the magnitude of the plane stress field inside the measured object at this time.

The disclosure further provides a system for online monitoring of a plane stress field without baseline data based on a piezoelectric transducer array, including:

a dispersion curve establishing module, where by using the dispersion curve establishing module, according to geometric dimensions and material parameters of a measured object, a dispersion curve of Lamb waves is established, a cut-off frequency of a first-order Lamb wave mode is determined, then a suitable frequency is selected within the cut-off frequency to excite piezoelectric wafers, and pure S0-mode Lamb waves are generated by means of symmetrical excitation;

a stress field characterization module, where by using the stress field characterization module, according to the invariant property of acoustoelastic coefficients of isotropic materials in different coordinate systems, acoustoelastic equations in different propagation directions are obtained, then a difference is calculated to obtain a linear relationship between the difference of velocity changes in different directions and the stress, and at the same time, according to a linear superposition relationship between stresses in different directions, the magnitude of a plane stress field of the measured object is calculated through the difference of three groups of velocity changes in different directions, thereby finally realizing the accurate characterization of the plane stress field by means of measurement results of the piezoelectric transducer array in different directions; and a stress field solving module, where by using the stress field solving module, Lamb wave signals are excited and received inside the measured object, Hilbert transform is performed on the received signals, signal envelopes are extracted, then acoustic time differences in different propagation directions are calculated through a cross-correlation algorithm, according to a linear relationship between acoustic time differences and velocity differences, it is determined that there is still a linear relationship between stresses and acoustic time differences in different propagation directions, and then, three groups of acoustic time differences in different directions are substituted into the pre-calibrated acoustoelastic equations to solve the plane stress field of the measured object.

The disclosure further provides an electronic device, including a memory and a processor. The memory stores computer programs, and when the processor executes the computer programs, the steps of the method for online monitoring of a plane stress field without baseline data based on a piezoelectric transducer array are implemented.

The disclosure further provides a computer-readable storage medium for storing computer instructions. When the computer instructions are executed by the processor, the steps of the method for online monitoring of a plane stress field without baseline data based on a piezoelectric transducer array are implemented.

The disclosure has the following beneficial effects:

The main advantage of the disclosure is that the anisotropy caused by pre-stresses is used to fuse the Lamb wave data in different propagation directions, so as to realize online monitoring of the plane stress field without baseline data.

DETAILED DESCRIPTION

The technical solutions in the examples of the disclosure are clearly and completely described below with reference to the drawings in the examples of the disclosure. It is apparent that the described examples are only a part of the examples of the disclosure, and are not all of the examples. Based on the examples of the disclosure, all other examples obtained by a person of ordinary skill in the art without involving any inventive effort all fall within the protection scope of the disclosure.

Aiming at the defects of the existing methods, in order to meet the urgent need for online monitoring of a plane stress field without baseline data, the disclosure invents a method for online monitoring of a plane stress field without baseline data based on a piezoelectric transducer array. On the basis of the acoustoelastic effect of Lamb waves, the linear relationship between the stress and the difference of velocity changes of the same-mode Lamb waves in different propagation directions is innovatively used to realize the accurate characterization of the plane stress field without the need of zero-stress standard sample reference data. Since Lamb waves have complex multi-mode characteristics, a suitable excitation frequency needs to be selected according to geometric dimensions of the structure to be measured, and then, only low-order mode Lamb waves are excited inside the measured structure to avoid serious waveform aliasing.

For isotropic measured objects, anisotropic characteristics will be generated under the action of pre-stresses, that is, the propagation velocities of ultrasonic waves in all directions are different, but there is a linear relationship between velocity changes in different propagation directions and stresses. Therefore, there is still a linear relationship between the difference of velocity changes in different propagation directions and the stress. According to this characteristic, a characterization method of an absolute stress field without baseline data can be implemented. Furthermore, the method of the disclosure can make full use of the low attenuation characteristics of the Lamb waves to realize online monitoring of the plane stress field with a large coverage area.

The technical solution adopted by the disclosure is a method for online monitoring of a plane stress field without baseline data based on a piezoelectric transducer array. First, according to geometric dimensions and material parameters of a measured object, a dispersion curve of Lamb waves is established to ensure that an excitation frequency of Lamb signals is lower than a first-order cut-off frequency, so as to avoid complex signal aliasing caused by the appearance of high-order modes. Previous studies have found that S0-mode Lamb waves have higher sensitivity to stresses, therefore, in the disclosure, the generation of an A0 mode is inhibited by means of symmetrical excitation of upper and lower surfaces, so as to ensure that only the S0 mode is excited inside the measured object. Then, through theoretical and simulated analysis, the linear relationship between S0-mode Lamb waves in different propagation directions and stresses is obtained, so as to further determine the linear relationship between the difference of velocity changes in different propagation directions and the stress, thereby finally realizing the accurate characterization of the plane stress field by means of measurement results of the piezoelectric transducer array in different directions. According to the selected excitation frequency, excitation signals modulated by a Hanning window are loaded inside a signal generator and are amplified by a power amplifier to drive a transmitting probe, the signals of a receiving probe at the other end are amplified by first-order weak signals, then received by a three-channel high-speed acquisition board and transmitted to a host computer through a PXIE bus and stored, and then, data processing is performed. Hilbert transform is performed on the signals, signal envelopes are extracted, then the acoustic time differences between Lamb wave signals in different propagation directions are calculated by a cross-correlation algorithm, and the results are substituted into the pre-calibrated acoustoelastic equations set to determine a mean stress field between the receiving and transmitting probes, thereby realizing the state characterization of the plane stress field of the measured object.

Figure 1:
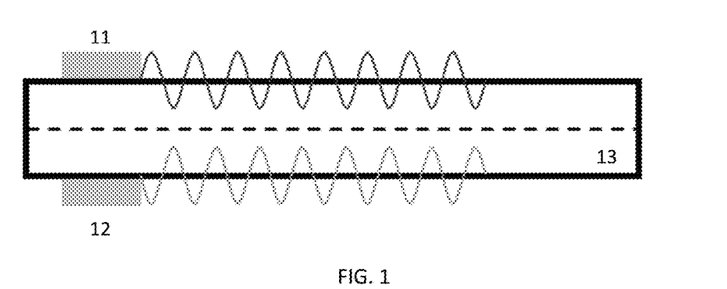
FIG. 1 is a schematic diagram of a symmetrical excitation manner of S0-mode Lamb waves, where 11 and 12 respectively represent a piezoelectric wafer exciter, and 13 represents an object to be measured.
Figure 2:
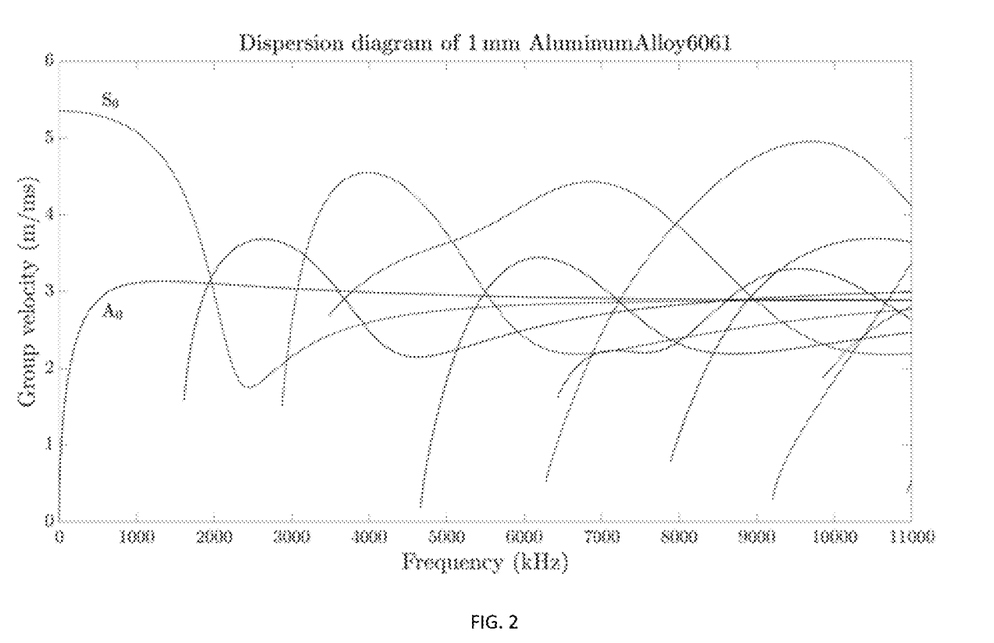
FIG. 2 is a schematic diagram of a group velocity dispersion curve of a 1 mm aluminum plate 6061.
Figure 3:
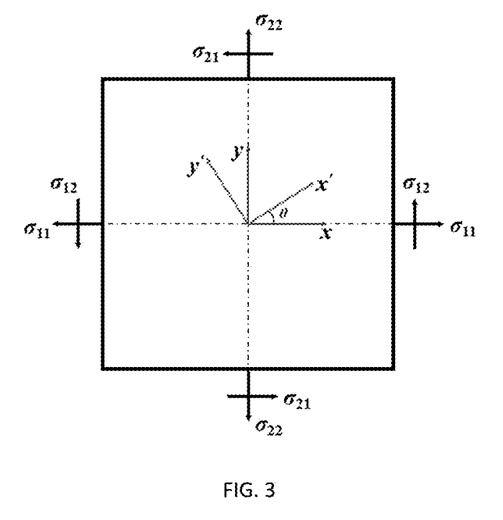
FIG. 3 is a schematic diagram of a measured object subjected to a plane stress field.

With reference to FIG. 1 to FIG. 7, the disclosure provides a method for online monitoring of a plane stress field without baseline data based on a piezoelectric transducer array, including:

according to geometric dimensions and material parameters of a measured object, a dispersion curve of Lamb waves is established, a cut-off frequency of a first-order Lamb wave mode is determined, then a suitable frequency is selected within the cut-off frequency to excite piezoelectric wafers, and pure S0-mode Lamb waves are generated by means of symmetrical excitation;

according to the invariant property of acoustoelastic coefficients of isotropic materials in different coordinate systems, acoustoelastic equations in different propagation directions are obtained, then a difference is calculated to obtain a linear relationship between the difference of velocity changes in different directions and the stress, and at the same time, according to a linear superposition relationship between stresses in different directions, the magnitude of a plane stress field of the measured object is calculated through the difference of three groups of velocity changes in different directions, thereby finally realizing the accurate characterization of the plane stress field by means of measurement results of the piezoelectric transducer array in different directions; and Lamb wave signals are excited and received inside the measured object, Hilbert transform is performed on the received signals, signal envelopes are extracted, then acoustic time differences in different propagation directions are calculated through a cross-correlation algorithm, according to a linear relationship between acoustic time differences and velocity differences, it is determined that there is still a linear relationship between stresses and acoustic time differences in different propagation directions, and then, three groups of acoustic time differences in different directions are substituted into the pre-calibrated acoustoelastic equations to solve the plane stress field of the measured object.

According to the geometric dimensions and the material parameters of the measured object, the dispersion curve of Lamb waves is established, and a Lamb wave dispersion equation of a free plate is a Rayleigh-Lamb wave dispersion equation, which meets:

$$\frac{\tan(qh)}{\tan(ph)} = -\frac{4k^2 pq}{(q^2 - k^2)^2}, \tag{1}$$

$$\frac{\tan(qh)}{\tan(ph)} = -\frac{(q^2 - k^2)^2}{4k^2 pq}, \tag{2}$$

where p and q are respectively expressed as:

$$p = \sqrt{\frac{\omega^2}{c_L^2} - k^2}, \tag{3}$$

$$q = \sqrt{\frac{\omega^2}{c_T^2} - k^2}, \tag{4}$$

in the equation, $c_L$ and $c_T$ respectively represent velocities of longitudinal waves and transverse waves, h represents a half of a thickness of the plate, $\omega$ represents an angular frequency of ultrasonic waves, and k represents a wave number.

Assuming that the object to be measured is an aluminum plate 6061 with a thickness of 1 mm, a dispersion curve of the structure to be measured can be obtained by solving Equations (1) and (2). According to the dispersion curve, it can be determined that the cut-off frequency of the first-order Lamb wave mode is 1.6 MHz, therefore, modulation signals with a frequency of 500 kHz are selected to excite the Lamb waves.

Figure 5:
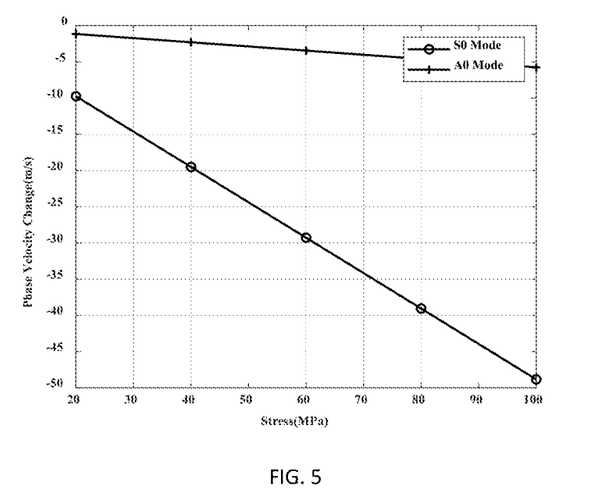
FIG. 5 is a schematic diagram of a difference between velocity changes in 0° and 90° directions when F=500 kHz and $T_{33}$=100 MPa.
Figure 6:
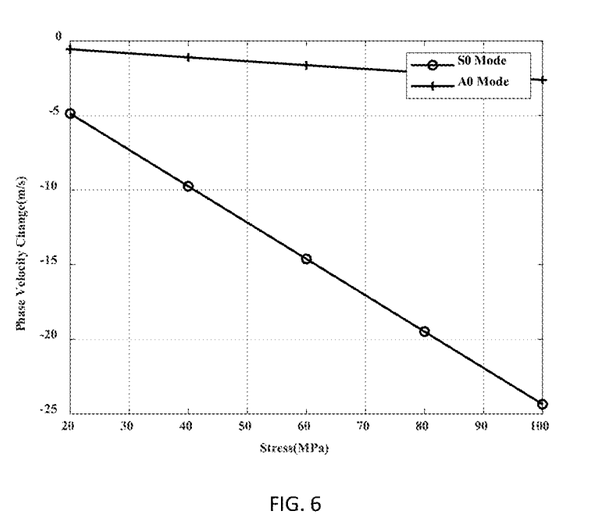
FIG. 6 is a schematic diagram of a difference between velocity changes in 0° and 45° directions when F=500 kHz and $T_{33}$=100 MPa.

Assuming that the measured object is subjected to plane stresses, in a coordinate system x-o-y, normal stresses are $\sigma_{11}$ and $\sigma_{22}$, and shear stresses are $\sigma_{12}$ and $\sigma_{21}$; according to the symmetry of the stresses, the values of $\sigma_{12}$ and $\sigma_{21}$ are equal, therefore, for Lamb waves propagating in an x direction, the acoustoelastic effect of the plane stress field can be expressed as:

$$\Delta v = K_{11}\sigma_{11} + K_{12}\sigma_{12} + K_{22}\sigma_{22} \tag{5},$$

in the equation, $K_{11}$, $K_{12}$ and $K_{22}$ respectively represent acoustoelastic coefficients of the Lamb waves in different propagation directions;

when the measured object belongs to an isotropic material, the acoustoelastic coefficients in different coordinate systems are exactly the same, therefore, the acoustoelastic effect of the Lamb waves propagating in an x' direction can be expressed as:

$$\Delta v = K_{11}\sigma_{11}' + K_{12}\sigma_{12}' + K_{22}\sigma_{22}' \tag{6},$$

in the equation, $\sigma'_{11}$, $\sigma_{12}'$ and $\sigma'_{22}$ represent normal stresses and shear stresses in a new coordinate system x'-o-y';

according to a coordinate transformation relationship between stresses, the following can be obtained:

$$\sigma'_{11} = \frac{\sigma_{11} + \sigma_{22}}{2} + \frac{\sigma_{11} - \sigma_{22}}{2}\cos(2\theta) + \sigma_{12}\sin(2\theta), \tag{7}$$

$$\sigma'_{22} = \frac{\sigma_{11} + \sigma_{22}}{2} - \frac{\sigma_{11} - \sigma_{22}}{2}\cos(2\theta) - \sigma_{12}\sin(2\theta), \tag{8}$$

$$\sigma'_{12} = -\frac{\sigma_{11} - \sigma_{22}}{2}\sin(2\theta) + \sigma_{12}\cos(2\theta), \tag{9}$$

where $\theta$ represents an angle;

a difference between propagation velocities along angles $\theta_1$ and $\theta_2$ is:

$$\begin{aligned} dv &= \Delta v(\theta_1) - \Delta v(\theta_2) \\ &= K_{11}\left[\frac{\sigma_{11} - \sigma_{22}}{2}(\cos(2\theta_1) - \cos(2\theta_2)) \right. \\ &\quad \left. + \sigma_{12}(\sin(2\theta_1) - \sin(2\theta_2))\right] \\ &\quad + K_{22}\left[\frac{\sigma_{11} - \sigma_{22}}{2}(-\cos(2\theta_1) + \cos(2\theta_2)) \right. \\ &\quad \left. + \sigma_{12}(-\sin(2\theta_1) + \sin(2\theta_2))\right] \\ &\quad + K_{12}\left[\frac{\sigma_{11} - \sigma_{22}}{2}(-\sin(2\theta_1) + \sin(2\theta_2)) \right. \\ &\quad \left. + \sigma_{12}(\cos(2\theta_1) - \cos(2\theta_2))\right] \end{aligned} \tag{10}$$

it can be seen from Equation (10) that the influence of each component of the plane stress field on dv has a linear superposition relationship, and when the plane stress field has only one component, dv can be respectively simplified as:

$$\begin{aligned} dv &= \Delta v(\theta_1) - \Delta v(\theta_2) \\ &= (K_{11} - K_{22})\left[\frac{\sigma_{11}}{2}(\cos(2\theta_1) - \cos(2\theta_2))\right], \\ &\quad - K_{12}\left[\frac{\sigma_{11}}{2}(\sin(2\theta_1) - \sin(2\theta_2))\right] \end{aligned} \tag{11}$$

$$\begin{aligned} dv &= \Delta v(\theta_1) - \Delta v(\theta_2) \\ &= (K_{11} - K_{22})\left[\frac{\sigma_{22}}{2}(-\cos(2\theta_1) + \cos(2\theta_2))\right], \\ &\quad - K_{12}\left[\frac{\sigma_{22}}{2}(-\sin(2\theta_1) + \sin(2\theta_2))\right] \end{aligned} \tag{12}$$

$$\begin{aligned} dv &= \Delta v(\theta_1) - \Delta v(\theta_2) \\ &= (K_{11} - K_{22})[\sigma_{12}(\sin(2\theta_1) - \sin(2\theta_2))]; \\ &\quad + K_{12}[\sigma_{12}(\cos(2\theta_1) - \cos(2\theta_2))] \end{aligned} \tag{13}$$

it can be found that to complete the measurement of the plane stress field, it is only necessary to determine the values of $K_{11}$-$K_{22}$ and $K_{12}$ through calibration tests;

assuming that there is only $\sigma_{11}$, $\theta_1$ is 0° and $\theta_2$ is 90°, the following can be obtained:

$$dv = \Delta v(\theta_1) - \Delta v(\theta_2) = (K_{11} - K_{22})\sigma_{11} \quad (14);$$

assuming that $\theta_1$ is 0° and $\theta_2$ is 45°, when there is $\sigma_{11}$, dv is expressed as:

$$dv = \Delta v(\theta_1) - \Delta v(\theta_2) = (K_{11} - K_{22})\frac{\sigma_{11}}{2} + K_{12}\frac{\sigma_{11}}{2}; \quad (15)$$

two acoustoelastic values of $K_{11}$-$K_{22}$ and $K_{12}$ are determined through Equations (14) and (15); a whole calibration process does not require zero-stress samples, and in a tensile test, it is necessary to measure a Lamb wave group velocity difference between two groups of different propagation directions;

the value of $K_{11}$-$K_{22}$ is set as K, and then, Equation (10) can be transformed into:

$$\begin{aligned} dv &= \Delta v(\theta_1) - \Delta v(\theta_2) \quad (16) \\ &= K\left[\frac{\sigma_{11}}{2}(\cos(2\theta_1) - \cos(2\theta_2))\right] \\ &\quad -K_{12}\left[\frac{\sigma_{11}}{2}(\sin(2\theta_1) - \sin(2\theta_2))\right] \\ &\quad +K\left[\frac{\sigma_{22}}{2}(-\cos(2\theta_1) + \cos(2\theta_2))\right] ; \\ &\quad -K_{12}\left[\frac{\sigma_{22}}{2}(-\sin(2\theta_1) + \sin(2\theta_2))\right] \\ &\quad +K[\sigma_{12}(\sin(2\theta_1) - \sin(2\theta_2))] \\ &\quad +K_{12}[\sigma_{12}(\cos(2\theta_1) - \cos(2\theta_2))] \end{aligned}$$

in Equation (16), dv is a measured value, K and $K_{12}$ are known quantities, and three components of the plane stress field are unknown quantities, therefore, by solving the equations established by three groups of dv, two normal stresses and one shear stress can be obtained; and in three times of dv measurement, it is not necessary to use the data in a zero-stress state as reference data, therefore, the measurement of the plane stress field without baseline data can be realized finally through multi-angle acquisition of piezoelectric transducer array sensors.

Figure 4:
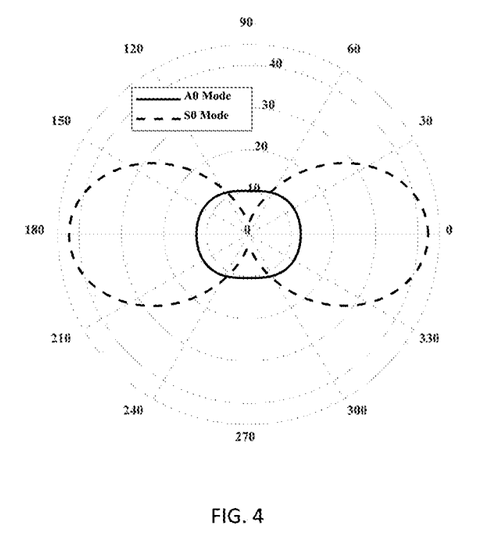
FIG. 4 is a diagram of group velocity changes in different directions when F=500 kHz and $T_{33}$=100 MPa.

Pre-stresses are applied to the measured object in different directions, and then, the influence of the stresses on the S0-mode group velocity is analyzed; a stress of $T_{33}$=100 MPa is applied to the measured object to obtain a velocity change in each propagation direction relative to a zero-stress state within a range of 0-360° in a plane perpendicular to a z axis; and under the action of stresses, an isotropic material exhibits anisotropy, that is, propagation velocities in different directions are different. When the measured object is subjected to a stress in a $T_{33}$ direction, the velocity change sensitivity of an S0 mode is better than that of an A0 mode. But under the action of $T_{33}$, there is an angle which enables the velocity change of the S0 mode to be zero. Therefore, when measurement is performed with data in a single direction, if the relationship between a stress direction and a measurement direction is unknown, this may cause incorrect results. This problem can be effectively solved by the multi-directional data collected by the piezoelectric array. 20 MPa is taken as a step value, $T_{33}$ is changed from 0 MPa to 100 MPa to obtain velocity difference changes of 0° and 90° as well as 0° and 45°, and acoustoelastic coefficients K and $K_{12}$ of the measured object are calculated according to Equations (14) and (15).

Figure 7:
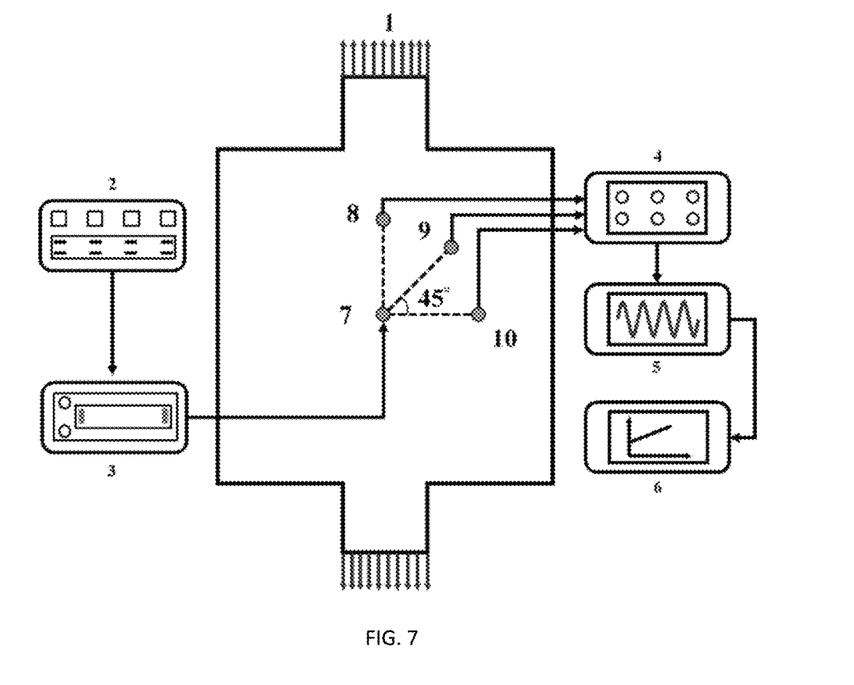
FIG. 7 is an integrated schematic diagram of a measurement system, where 1 represents a tensiometer, 2 represents an arbitrary waveform generator, 3 represents a power amplifier, 4 represents a high-bandwidth receiving and amplifying device, 5 represents a three-channel high-speed data acquisition system, 6 represents a personal computer (PC), 7 represents a piezoelectric wafer exciter, and 8, 9 and 10 respectively represent a piezoelectric wafer sensor.

After the calibration of the acoustoelastic coefficients is completed, actual measurement of the stress state of the measured structure can be performed, an arbitrary waveform generator is used to generate low-voltage modulation signals which are then amplified by a power amplifier to excite piezoelectric wafers to generate Lamb waves, S0-mode Lamb waves propagate inside the measured object and are received by three piezoelectric wafer sensors, received signals are mV-order weak signals, the weak signals are amplified and filtered, a lower cut-off frequency and an upper cut-off frequency of a filter are set according to bandwidths of excitation signals, the amplified and filtered signals are input into a high-speed data acquisition system, the signals are encoded by an FPGA chip, and sampled signals are transmitted into a host computer by a PXIE bus and are stored for subsequent data processing.

Hilbert transform is performed on the signals received by the piezoelectric wafer sensors; after the Hilbert transform, the amplitude envelopes of the received signals can be extracted, and then, a propagation acoustic time difference between S0-mode Lamb waves in different propagation directions can be calculated by a cross-correlation algorithm; since the propagation distances between transmitting transducers and receiving transducers are the same, for isotropic materials, the relationship between a propagation time difference and a velocity difference meets:

$$\Delta t = t_1 - t_2 = \frac{L}{c_1} - \frac{L}{c_2} = \frac{L(c_2 - c_1)}{c_1 c_2} \approx -\frac{L\Delta c}{c^2}, \quad (17)$$

in the equation, L represents a distance between receiving and transmitting transducers, and c represents a propagation velocity when there is no stress; and it can be seen from Equation (17) that there is an approximate linear relationship between acoustic time differences in different propagation directions and stresses, therefore, the acoustic time differences obtained by the cross-correlation algorithm are substituted into the calibrated acoustoelastic equations to determine the magnitude of the plane stress field inside the measured object at this time.

The disclosure further provides a system for online monitoring of a plane stress field without baseline data based on a piezoelectric transducer array, including:

a dispersion curve establishing module, where by using the dispersion curve establishing module, according to geometric dimensions and material parameters of a measured object, a dispersion curve of Lamb waves is established, a cut-off frequency of a first-order Lamb wave mode is determined, then a suitable frequency is selected within the cut-off frequency to excite piezoelectric wafers, and pure S0-mode Lamb waves are generated by means of symmetrical excitation;

a stress field characterization module, where by using the stress field characterization module, according to the invariant property of acoustoelastic coefficients of isotropic materials in different coordinate systems, acoustoelastic equations in different propagation directions are obtained, then a difference is calculated to obtain a linear relationship between the difference of velocity changes in different directions and the stress, and at the same time, according to a linear superposition relationship between stresses in different directions, the magnitude of a plane stress field of the measured object is calculated through the difference of three groups of velocity changes in different directions, thereby finally realizing the accurate characterization of the plane stress field by means of measurement results of the piezoelectric transducer array in different directions; and a stress field solving module, where by using the stress field solving module, Lamb wave signals are excited and received inside the measured object, Hilbert transform is performed on the received signals, signal envelopes are extracted, then acoustic time differences in different propagation directions are calculated through a cross-correlation algorithm, according to a linear relationship between acoustic time differences and velocity differences, it is determined that there is still a linear relationship between stresses and acoustic time differences in different propagation directions, and then, three groups of acoustic time differences in different directions are substituted into the pre-calibrated acoustoelastic equations to solve the plane stress field of the measured object.

The disclosure further provides an electronic device, including a memory and a processor. The memory stores computer programs, and when the processor executes the computer programs, the steps of the method for online monitoring of a plane stress field without baseline data based on a piezoelectric transducer array are implemented.

The disclosure further provides a computer-readable storage medium for storing computer instructions. When the computer instructions are executed by the processor, the steps of the method for online monitoring of a plane stress field without baseline data based on a piezoelectric transducer array are implemented.

Under normal temperature conditions, the measured object is an aluminum plate 6061 with a thickness of 1 mm, which is an isotropic material, an arbitrary waveform generator is used to generate a 500 kHz pulse waveform modulated by a Hanning window, low-frequency signals generated by a signal generator are subjected to first-stage amplification by an Aigtek power amplifier, piezoelectric wafer exciters are excited by high-voltage signals, trigger signals are generated at the same time, and ultrasonic signals obtained by piezoelectric wafer sensors are acquired by a high-speed data acquisition board. Before the received signals are acquired, the signals are subjected to signal weakening and band-pass filtering first, the signals are amplified to an input voltage range of the data acquisition board, low-frequency noise and high-frequency noise in the signals are filtered out at the same time, the received signals are acquired continuously for 16 times, and the acquired signals are subjected to smooth filtering to filter out a part of electronic noise to improve a signal-to-noise ratio of the received signals. Then, the acoustic time differences of S0-mode Lamb waves in different propagation directions are calculated by means of the Hilbert transform and the cross-correlation algorithm, the acoustic time differences are substituted into the pre-calibrated acoustoelastic equations, and the whole plane stress field of the measured object can be calculated through three groups of acoustic time differences in different propagation directions.

The method for online monitoring of a plane stress field without baseline data based on a piezoelectric transducer array, provided by the disclosure, innovatively considers the combined action of multi-directional Lamb waves, and according to the linear relationship between velocity changes in different propagation directions under the action of stresses and the stresses, linear equations between velocity differences in different propagation directions and stresses are obtained, so that online monitoring of a state of an absolute plane stress field of the measured structure can be realized without any reference baseline data.

The method, system, device and medium for online monitoring of a plane stress field without baseline data based on a piezoelectric transducer array, provided by the disclosure, have been described in detail above. The principles and implementations of the disclosure are described by specific examples in the text. The description of the above examples is only used to help understand the method and core idea of the disclosure. Meanwhile, for those skilled in the art, according to the idea of the disclosure, there will be changes in specific implementations and application scope. In conclusion, the content of the description shall not be construed as limiting the disclosure.

What is claimed is:

1. A method for online monitoring of a plane stress field without baseline data, based on a piezoelectric transducer array, comprising:

according to geometric dimensions and material parameters of a measured object, establishing a dispersion curve of Lamb waves, determining a cut-off frequency of a first-order Lamb wave mode, then selecting a suitable frequency within the cut-off frequency to excite piezoelectric wafers, and generating pure S0-mode Lamb waves by means of symmetrical excitation;

according to the invariant property of acoustoelastic coefficients of isotropic materials in different coordinate systems, obtaining acoustoelastic equations in different propagation directions, then calculating a difference to obtain a linear relationship between a difference of velocity changes in different directions and stress, and at the same time, according to a linear superposition relationship between stresses in different directions, calculating a magnitude of a plane stress field of the measured object through a difference of three groups of velocity changes in different directions, thereby finally realizing characterization of the plane stress field by means of measurement results of the piezoelectric transducer array in different directions; and exciting and receiving Lamb wave signals inside the measured object, performing Hilbert transform on the received signals, extracting signal envelopes, then calculating acoustic time differences in different propagation directions through a cross-correlation algorithm, according to a linear relationship between acoustic time differences and velocity differences, determining that there is still a linear relationship between stresses and acoustic time differences in different propagation directions, and then, substituting three groups of acoustic time differences in different directions into pre-calibrated acoustoelastic equations to solve the plane stress field of the measured object.

2. The method according to claim 1, wherein according to the geometric dimensions and the material parameters of the measured object, the dispersion curve of Lamb waves is established, and a Lamb wave dispersion equation of a free plate is a Rayleigh-Lamb wave dispersion equation, which meets:

$$\frac{\tan(qh)}{\tan(ph)} = -\frac{4k^2 pq}{(q^2-k^2)^2}, \quad (1)$$

$$\frac{\tan(qh)}{\tan(ph)} = -\frac{(q^2-k^2)^2}{4k^2 pq}, \quad (2)$$

wherein p and q are respectively expressed as:

$$p = \sqrt{\frac{\omega^2}{c_L^2} - k^2}, \quad (3)$$

$$q = \sqrt{\frac{\omega^2}{c_T^2} - k^2}, \quad (4)$$

in the equation, $c_L$ and $c_T$ respectively represent velocities of longitudinal waves and transverse waves, h represents a half of a thickness of the plate, $\omega$ represents an angular frequency of ultrasonic waves, and k represents a wave number.

3. The method according to claim 2, wherein modulation signals with a frequency of 500 kHz are selected to excite the Lamb waves.

4. The method according to claim 3, wherein the measured object is subjected to plane stresses, in a coordinate system x-o-y, normal stresses are $\sigma_{11}$ and $\sigma_{22}$, and shear stresses are $\sigma_{12}$ and $\sigma_{21}$; according to the symmetry of the stresses, the values of $\sigma_{12}$ and $\sigma_{21}$ are equal, therefore, for Lamb waves propagating in an x direction, the acoustoelastic effect of the plane stress field is expressed as:

$$\Delta v = K_{11}\sigma_{11} + K_{12}\sigma_{12} + K_{22}\sigma_{22} \quad (5),$$

in the equation, $K_{11}$, $K_{12}$ and $K_{22}$ respectively represent acoustoelastic coefficients of the Lamb waves in different propagation directions;

when the measured object belongs to an isotropic material, the acoustoelastic coefficients in different coordinate systems are exactly the same, therefore, the acoustoelastic effect of the Lamb waves propagating in an x' direction is expressed as:

$$\Delta v = K_{11}\sigma_{11}' + K_{12}\sigma_{12}' + K_{22}\sigma_{22}' \quad (6),$$

in the equation, $\sigma_{11}'$, $\sigma_{12}'$ and $\sigma_{22}'$ represent normal stresses and shear stresses in a new coordinate system x'-o-y';

according to a coordinate transformation relationship between stresses, the following is obtained:

$$\sigma_{11}' = \frac{\sigma_{11}+\sigma_{22}}{2} + \frac{\sigma_{11}-\sigma_{22}}{2}\cos(2\theta) + \sigma_{12}\sin(2\theta), \quad (7)$$

$$\sigma_{22}' = \frac{\sigma_{11}+\sigma_{22}}{2} - \frac{\sigma_{11}-\sigma_{22}}{2}\cos(2\theta) - \sigma_{12}\sin(2\theta), \quad (8)$$

$$\sigma_{12}' = -\frac{\sigma_{11}-\sigma_{22}}{2}\sin(2\theta) + \sigma_{12}\cos(2\theta), \quad (9)$$

wherein $\theta$ represents an angle;

a difference between propagation velocities along angles $\theta_1$ and $\theta_2$ is:

$$\begin{aligned} dv &= \Delta v(\theta_1) - \Delta v(\theta_2) \\ &= K_{11}\left[\frac{\sigma_{11}-\sigma_{22}}{2}(\cos(2\theta_1)-\cos(2\theta_2))\right. \\ &\quad + \sigma_{12}(\sin(2\theta_1)-\sin(2\theta_2))\Big] \\ &\quad + K_{22}\left[\frac{\sigma_{11}-\sigma_{22}}{2}(-\cos(2\theta_1)+\cos(2\theta_2))\right.; \\ &\quad + \sigma_{12}(-\sin(2\theta_1)+\sin(2\theta_2))\Big] \\ &\quad + K_{12}\left[\frac{\sigma_{11}-\sigma_{22}}{2}(-\sin(2\theta_1)+\sin(2\theta_2))\right. \\ &\quad + \sigma_{12}(\cos(2\theta_1)-\cos(2\theta_2))\Big] \end{aligned} \quad (10)$$

in Equation (10) the influence of each component of the plane stress field on dv has a linear superposition relationship, and when the plane stress field has only one component, dv is respectively simplified as:

$$\begin{aligned} dv &= \Delta v(\theta_1) - \Delta v(\theta_2) \\ &= (K_{11}-K_{22})\left[\frac{\sigma_{11}}{2}(\cos(2\theta_1)-\cos(2\theta_2))\right], \\ &\quad -K_{12}\left[\frac{\sigma_{11}}{2}(\sin(2\theta_1)-\sin(2\theta_2))\right] \end{aligned} \quad (11)$$

$$\begin{aligned} dv &= \Delta v(\theta_1) - \Delta v(\theta_2) \\ &= (K_{11}-K_{22})\left[\frac{\sigma_{22}}{2}(-\cos(2\theta_1)+\cos(2\theta_2))\right], \\ &\quad -K_{12}\left[\frac{\sigma_{22}}{2}(-\sin(2\theta_1)+\sin(2\theta_2))\right] \end{aligned} \quad (12)$$

$$\begin{aligned} dv &= \Delta v(\theta_1) - \Delta v(\theta_2) \\ &= (K_{11}-K_{22})[\sigma_{12}(\sin(2\theta_1)-\sin(2\theta_2))]; \\ &\quad + K_{12}[\sigma_{12}(\cos(2\theta_1)-\cos(2\theta_2))] \end{aligned} \quad (13)$$

it is found that to complete the measurement of the plane stress field, it is only necessary to determine the values of $K_{11}$-$K_{22}$ and $K_{12}$ through calibration tests;

that there is only $\sigma_{11}$, $\theta_1$ is 0° and $\theta_2$ is 90°, the following is obtained:

$$dv = \Delta v(\theta_1) - \Delta v(\theta_2) = (K_{11}-K_{22})\sigma_{11} \quad (14);$$

that $\theta_1$ is 0° and $\theta_2$ is 45°, when there is $\sigma_{11}$, dv is expressed as:

$$dv = \Delta v(\theta_1) - \Delta v(\theta_2) = (K_{11}-K_{22})\frac{\sigma_{11}}{2} + K_{12}\frac{\sigma_{11}}{2}; \quad (15)$$

two acoustoelastic values of $K_{11}$-$K_{22}$ and $K_{12}$ are determined through Equations (14) and (15); a whole calibration process does not require zero-stress samples, and in a tensile test, it is necessary to measure a Lamb wave group velocity difference between two groups of different propagation directions;

the value of $K_{11}$-$K_{22}$ is set as K, and then, Equation (10) is transformed into:

$$\begin{aligned} dv &= \Delta v(\theta_1) - \Delta v(\theta_2) \\ &= K\left[\frac{\sigma_{11}}{2}(\cos(2\theta_1)-\cos(2\theta_2))\right] \\ &\quad -K_{12}\left[\frac{\sigma_{11}}{2}(\sin(2\theta_1)-\sin(2\theta_2))\right] \\ &\quad +K\left[\frac{\sigma_{22}}{2}(-\cos(2\theta_1)+\cos(2\theta_2))\right]; \\ &\quad -K_{12}\left[\frac{\sigma_{22}}{2}(-\sin(2\theta_1)+\sin(2\theta_2))\right] \\ &\quad +K[\sigma_{12}(\sin(2\theta_1)-\sin(2\theta_2))] \\ &\quad +K_{12}[\sigma_{12}(\cos(2\theta_1)-\cos(2\theta_2))] \end{aligned} \quad (16)$$

in Equation (16), dv is a measured value, K and $K_{12}$ are known quantities, and three components of the plane stress field are unknown quantities, therefore, by solving the equations established by three groups of dv, two normal stresses and one shear stress is obtained; and in three times of dv measurement, it is not necessary to use the data in a zero-stress state as reference data, therefore, the measurement of the plane stress field without baseline data is realized finally through multi-angle acquisition of piezoelectric transducer array sensors.

5. The method according to claim 4, wherein pre-stresses are applied to the measured object in different directions, and then, the influence of the stresses on an S0-mode group velocity is analyzed; a stress of $T_{33}$=100 MPa is applied to the measured object to obtain a velocity change in each propagation direction relative to a zero-stress state within a range of 0-360° in a plane perpendicular to a z axis; and 20 MPa is taken as a step value, $T_{33}$ is changed from 0 MPa to 100 MPa to obtain velocity difference changes of 0° and 90° as well as 0° and 45°, and acoustoelastic coefficients K and $K_{12}$ of the measured object are calculated according to Equations (14) and (15).

6. The method according to claim 5, wherein after the calibration of the acoustoelastic coefficients is completed, actual measurement of the stress state of the measured structure is performed, an arbitrary waveform generator is used to generate low-voltage modulation signals which are then amplified by a power amplifier to excite piezoelectric wafers to generate Lamb waves, S0-mode Lamb waves propagate inside the measured object and are received by three piezoelectric wafer sensors, received signals are mV-order weak signals, the weak signals are amplified and filtered, a lower cut-off frequency and an upper cut-off frequency of a filter are set according to bandwidths of excitation signals, the amplified and filtered signals are input into a high-speed data acquisition system, the signals are encoded by a field programmable gate array (FPGA) chip, and sampled signals are transmitted into a host computer by a PXIE bus and are stored for subsequent data processing.

7. The method according to claim 6, wherein Hilbert transform is performed on the signals received by the piezoelectric wafer sensors; after the Hilbert transform, the amplitude envelopes of the received signals is extracted, and then, a propagation acoustic time difference between S0-mode Lamb waves in different propagation directions is calculated by the cross-correlation algorithm; since the propagation distances between transmitting transducers and receiving transducers are the same, for isotropic materials, the relationship between a propagation time difference and a velocity difference meets:

$$\Delta t = t_1 - t_2 = \frac{L}{c_1} - \frac{L}{c_2} = \frac{L(c_2 - c_1)}{c_1 c_2} \approx -\frac{L\Delta c}{c^2}, \quad (17)$$

in the equation, L represents a distance between receiving and transmitting transducers, and c represents a propagation velocity when there is no stress; and in Equation (17) there is an approximate linear relationship between acoustic time differences in different propagation directions and stresses, therefore, the acoustic time differences obtained by the cross-correlation algorithm are substituted into the calibrated acoustoelastic equations to determine the magnitude of the plane stress field inside the measured object at this time.

8. An electronic device, comprising a memory and a processor, wherein the memory stores computer programs, and when the processor executes the computer programs, the steps of the methods according to claim 1 are implemented.

9. A non-transitory computer-readable storage medium for storing computer instructions, wherein when the computer instructions are executed by a processor, the steps of the methods according to claim 1 are implemented.

10. A system for online monitoring of a plane stress field without baseline data, based on a piezoelectric transducer array, comprising:
a dispersion curve establishing module, wherein by using the dispersion curve establishing module, according to geometric dimensions and material parameters of a measured object, a dispersion curve of Lamb waves is established, a cut-off frequency of a first-order Lamb wave mode is determined, then a suitable frequency is selected within the cut-off frequency to excite piezoelectric wafers, and pure S0-mode Lamb waves are generated by means of symmetrical excitation;
a stress field characterization module, wherein by using the stress field characterization module, according to the invariant property of acoustoelastic coefficients of isotropic materials in different coordinate systems, acoustoelastic equations in different propagation directions are obtained, then a difference is calculated to obtain a linear relationship between a difference of velocity changes in different directions and stress, and at the same time, according to a linear superposition relationship between stresses in different directions, a magnitude of a plane stress field of the measured object is calculated through a difference of three groups of velocity changes in different directions, thereby finally realizing characterization of the plane stress field by means of measurement results of the piezoelectric transducer array in different directions; and
a stress field solving module, wherein by using the stress field solving module, Lamb wave signals are excited and received inside the measured object, Hilbert transform is performed on the received signals, signal envelopes are extracted, then acoustic time differences in different propagation directions are calculated through a cross-correlation algorithm, according to a linear relationship between acoustic time differences and velocity differences, it is determined that there is still a linear relationship between stresses and acoustic time differences in different propagation directions, and then, three groups of acoustic time differences in different directions are substituted into pre-calibrated acoustoelastic equations to solve the plane stress field of the measured object.

* * * * *